United States Patent
Mulford

(10) Patent No.: US 6,549,778 B1
(45) Date of Patent: Apr. 15, 2003

(54) METHOD OF COMMUNICATION MODE CHANGE NOTIFICATION

(75) Inventor: Keith I. Mulford, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/594,202

(22) Filed: Jan. 31, 1996

(51) Int. Cl.[7] .................................. H04Q 7/20
(52) U.S. Cl. .................... 455/439; 455/426; 455/552; 370/331
(58) Field of Search ................... 455/432, 433, 455/435, 517, 525, 437, 553, 445, 426, 439, 450, 518, 552; 370/331

(56) References Cited

U.S. PATENT DOCUMENTS

| | | | |
|---|---|---|---|
| 4,783,844 A | * 11/1988 | Higashiyama et al. ...... | 455/455 |
| 5,127,042 A | * 6/1992 | Gillig et al. ............... | 455/7 |
| 5,222,248 A | * 6/1993 | McDonald et al. ......... | 455/509 |
| 5,309,502 A | * 5/1994 | Hirai .......................... | 455/462 |
| 5,444,766 A | * 8/1995 | Farwell et al. .............. | 455/437 |
| 5,493,693 A | * 2/1996 | Tanaka et al. .............. | 455/553 |
| 5,499,386 A | * 3/1996 | Karlsson ..................... | 455/525 |
| 5,542,097 A | * 7/1996 | Ward et al. ................. | 455/525 |
| 5,590,396 A | * 12/1996 | Henry ........................ | 455/426 |
| 5,732,359 A | * 3/1998 | Baranowsky, II et al. .. | 455/551 |
| 5,832,379 A | * 11/1998 | Mallinckrodt ............... | 455/427 |

* cited by examiner

Primary Examiner—Edward F. Urban
Assistant Examiner—Charles Craver
(74) Attorney, Agent, or Firm—Shaun L. Lukasik; Terri S. Hughes

(57) ABSTRACT

A method of communication mode change notification includes detecting (201), by a communication unit having an identification (ID) within a communications system having an infrastructure, that the communication unit's user initiated a communications mode change from a first communication resource to a second communication resource having an identity. The communication unit transmits (209) to the infrastructure a notification message including the ID and the identity of the second communication resource.

18 Claims, 2 Drawing Sheets

METHOD OF COMMUNICATION MODE CHANGE NOTIFICATION

FIELD OF THE INVENTION

This invention relates to communication systems, including but not limited to communication mode changes for communication units served by radio frequency communication systems.

BACKGROUND OF THE INVENTION

Radio frequency (RF) communications systems are known. Many RF communication systems offer multiple modes of communication within a single system. These modes include trunked communications, conventional communications, cellular communications, and talk-around communications, all of which are manually selectable by the user of an RF communication unit, such as a mobile or portable radio. In large, managed RF communication systems or networks, such as public safety or utility systems, communication units, under normal conditions, are in communication on a known path with a central dispatcher who is responsible for the tracking of units and the coordination of their workloads.

A problem arises when a communication unit user manually selects to move his communication unit to a different communication mode, such as talk-around, conventional, or roaming into another independent communication system, which mode currently does not facilitate tracking or any other method of locating of the communication unit. The problem exists because no dispatcher of the home communication system, i.e., the communication system where the user normally is registered, knows where the communication unit is within the communication system or within another communication system. The infrastructure of the communication system does not know that the communication unit has its current communication resources, where the communication unit has moved, or when the communication unit left the communication mode last associated with the home communication system.

This situation becomes a problem when the infrastructure of the communication system needs to find the communication unit. In a cellular communication system, the infrastructure of the communication system knows that the subscriber has left the system when the infrastructure tries to call the subscriber and the subscriber does not answer. Currently, in public safety communication systems, a user must typically ask permission from the dispatcher to leave and the dispatcher must manually keep track of this information. This method can be both clumsy and cumbersome, especially when there is a lot of traffic on a communication system during any period of time. In a closed trunked system, a dispatch interrupter priority scan feature may help to find the communication unit when its user has manually selected to change to a different communication resource, providing that the new resource is still part of the original system. If, however, the communication unit goes outside the system, the unit will not be able to be found using these particular methods. Hand-off methods exist such that when a communication is handed off from one communication site to another within the same communication system, the user is de-affiliated with the old site around the same time as becoming affiliated with the new site. Also known in the art is that a communication unit automatically notifies or de-registers with its communication system when the radio is turned off. In addition, it is known for a communication unit to register in a new system when the unit roams into the new system.

Accordingly, there is a need for a method of keeping track of communication units when they change communication modes.

DESCRIPTION OF A PREFERRED EMBODIMENT

The following describes a method whereby communication units automatically transmit, to the current home system, information describing the intended move to a different communication mode prior to the communication unit's changing its communication mode selection. When a communication unit user manually changes the channel selector on his communication unit, the communication unit first sends a message to the infrastructure of the communication system, the message containing the identity of the intended communication resource and an identification (ID) of the communication unit. The notification information is stored by a database within the home system and is provided to the dispatcher upon request. Information provided to the dispatcher may include the channel where the unit is located and or information on what links or paths to use to reach the communication unit. Once the notification has been sent, and an optional acknowledgment is received by the communication unit, the communication unit completes the move to the selected communication mode by changing the communication unit's frequency and/or its trunked system talkgroup identification, as appropriate in the particular situation.

The present method comprises the steps of detecting, by a communication unit having an identification (ID) within a communications system having an infrastructure, that the communication unit's user initiated a communications mode change from a first communication resource to a second communication resource having an identity. The communication unit transmits to the infrastructure a message including the ID and the identity of the second communication resource. The second communication resource may be part of the communications system or part of another communications system. Acknowledgment of receipt of the message by the infrastructure may or may not be required. If an acknowledgment is required, receiving the acknowledgment before changing the communication unit to the second communication resource. If an acknowledgment is not required, changing the communication unit to the second communication resource. In addition, if an acknowledgment is required, a timer may be started when the message is transmitted. When the timer expires, if the acknowledgment is not yet received, the communication unit may be changed to the second communication resource if the communication unit is programmed to permit an unacknowledged change after timer "expiration. When the timer expires, if the acknowledgment is not yet received, the communication unit is prohibited from changing to the second communication resource if the communication unit is programmed to prevent an unacknowledged change after timer expiration. Additionally, before transmitting the message, it may be determined whether to transmit the message on the first communication resource or on a third communication resource, and the message is transmitted accordingly.

Figure 1:
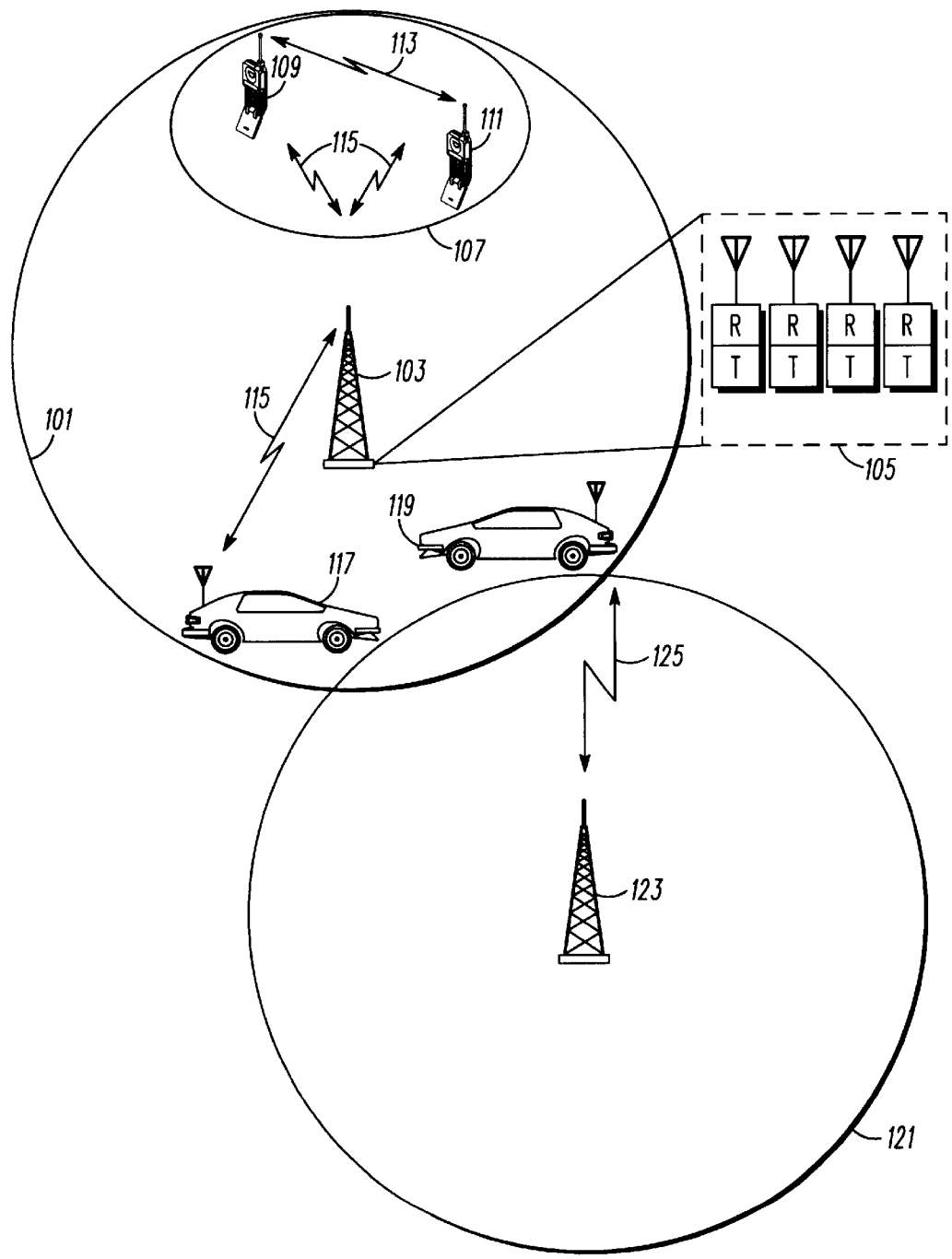
FIG. 1 is a block diagram of multiple communication systems in accordance with the invention.

Various aspects of a first and a second communication system are shown in FIG. 1. This communication system provides communications within a coverage area 101. A base station site 103, which comprises in the preferred embodiment a single conventional base station or a trunked system with a plurality of base stations 105, may also comprise a dispatcher, a zone controller, and other infrastructure for providing trunked, conventional, cellular, and/or talk-around channels within the communication system. A talk-around coverage area 107 is depicted with two communication units 109 and 111 that communicate to each other via a talk-around channel 113. This communication system has one or more communications channels, transmission on at least one channel 115 of which is provided to the mobile communication units 109, 111, and 117.

If the mobile communication unit 117 selects for its communications another independent communication system such as the communication system having coverage area 121 and serviced by a second base site 123, the first or home communication system (i.e., the communication system in which the communication unit is registered) serviced by the first base site 103 will not be able to keep track of the mobile communication unit 117 in the prior art. In the present invention, however, when the communication unit detects that the communication unit's 117 user has initiated a communications mode change from the home communication system with base site 103 to the second communication system with base site 123, the communication unit 117 transmits a message to the infrastructure at base site 103. This message includes the identification (ID) of the communication unit 117 and the identity of a communication resource of the communication mode to which the user intends to switch, which resource in this example is a communication resource belonging to the second communication system serviced by the second base site 123. A second communication unit 119, travelling from the second communication system to the first communication system, is shown transmitting information to the second base site 123 via an RF communication resource 125. In accord with the present invention, the second mobile communication unit 119, upon manually selecting the second system (serviced by the second base site 123), transmits to the infrastructure at the second base site 123 via the RF communication resource 125 a message including the ID of the mobile communication unit 119 and the identity of a communication resource of the first or intended communication system, such as one provided by the first base site 103.

If, for example, the communication unit 109 or 111 user selects for communications the direct talk-around communication resource 113, which is not part of the unit's home communication system, which is serviced by the first base site 103. Previously, the first or home communication system serviced by the first base site 103 was unable to keep track of the communication units 109 and 111 in this situation. In the present invention, however, when the communication unit 109 or 111 detects that the communication unit's user has initiated a communications mode change from the home communication system serviced by the first base site 103 to the talk-around communication resource 113, the communication unit 109 or 111 transmits a notification message to the infrastructure at the first base site 103. This message includes the identification (ID) of the communication unit 109 or 111 and the identity of a communication resource of the communication mode where the user intends to switch. The resource in this example is the communication resource 113 that is in the talk-around communications mode.

Figure 2:
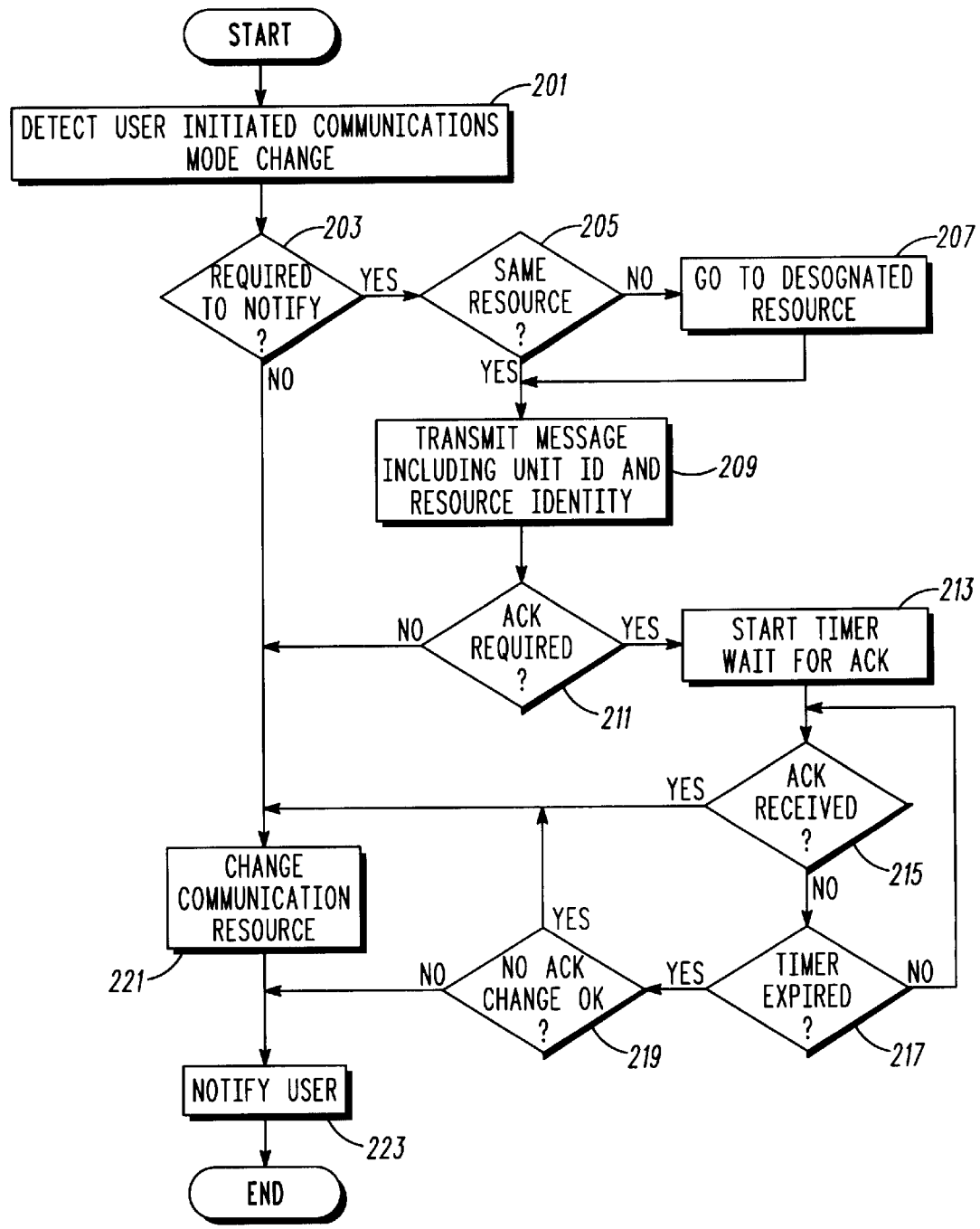
FIG. 2 is a flowchart showing communication mode change notification in accordance with the invention.

A flow chart showing notification of communications mode change is shown in FIG. 2. The steps of the flowchart are performed by a microprocessor disposed in a communication unit 109, 111, 117, 119 in the preferred embodiment. At step 201, a communication unit 109 or 117 detects that a user initiated a communications mode change. For example, a communication unit 109 user may decide to switch to a talk-around channel 113 and enters the mode change by changing the communication unit's channel selector to an RF channel 113 that supports talk-around communications. In another example, the communication unit 117 may wish to transfer to a different communication system, independent from its home communication system serviced by the first base site 103, such as that system serviced by the second base site 123.

In the preferred embodiment, the communications mode change is detected by reading the communication unit's channel selector and noting any change as a potential communications mode change. Because multiple channels on the communication unit's channel selector may correspond to the same communication mode, e.g., six trunked communications channels all having the same mode, a mode for each channel on the communication unit's channel selector is stored in memory within the communication unit 109 or 117. When the channel selector moves from one channel to another channel and the communication mode for both channels is the same, no communication mode change is detected. If the communication mode is different for between the two channels, then a communication mode change is detected. Modes can be stored as trunked, conventional, talk-around, cellular, roaming, and so forth. For a simpler detection scheme, the modes can simply be labelled with "notify" and "don't notify," depending on whether a change to that mode requires notification to the communication system.

Particular examples are as follows. Channel selector positions on the communication unit have preset modes of operation with respect to transmitting an intended mode change message. Selector positions that point to modes that are part of a communication system may have one of three preset modes: 1) send a notification on the current channel before moving; 2) send a notification on a designation channel (e.g., conventional channel or trunked control channel); or 3) do not send notification (for example, when no receiving decoder is in place at the infrastructure ). Selector positions which point to modes that are not part of a communication system may have one of two preset modes: 1) send a notification on a designated channel (other conventional channel or trunked control channel); or 2) do not send notification.

If at step 203 the communication unit 109 or 117 is required to notify the infrastructure of the communication system on which the communication unit 109 or 117 is currently registered, the process continues with step 205. The communication unit 109 or 117 determines which communication resource to transmit a notification message on at step 205. In other words, the communication unit 109 or 117 determines whether or not to use the current or same communication resource on which the communication unit is presently programmed to transmit. For example, a fixed communication resource may be programmed into the communication unit 109 or 117 for transmission of these notification messages. In the alternative, the communication unit 109 or 117 may be programmed to transmit the message on any current control channel, a designated data channel, and so forth. For example, in a trunked system, the notification message may be transmitted over the control channel. In the case of a conventional system, the notification message may be transmitted on either the current communication path or a designated path or communication resource established to receive such notification information. If the communication unit is not to use the same resource on which it is currently programmed to transmit at step 205, the process continues with step 207, where the communication unit switches to the designated communication resource, which may be a preprogrammed channel, a control channel, and so forth, and the process continues with step 209. If at step 205, the communication unit is to use the same communication resource on which the communication unit is currently programmed to transmit, the process continues with step 209.

At step 209, the communication unit 109 or 117 transmits the notification message on the appropriate communication resource as determined at steps 205 and 207. The (notification) message includes the ID of the communication unit 109 or 117 and the identity of a communication resource belonging to the mode to which the user intends to switch. For example, this resource identity may be "channel 3" for a resource within the current communication system. Channel 3 may be a talk-around channel or a conventional channel. If, however, the communication unit intends to transfer or roam to a different communication system, an identity of a communication resource of the second communication system will be transmitted to the home communication system as the communication resource identity of the second communication system.

The notification information is stored by a database within the infrastructure of the communication system and is provided to a dispatcher upon request. Information provided to the dispatcher may include the communication channel where the unit is located and/or information on what links or paths to use to reach the communication unit.

After step 209, the process continues with step 211, where they communication unit determines if an acknowledgment is required to be received by the communication unit 109 or 117 before the communication unit may change its mode to the mode desired by the user. In the preferred embodiment, channel selector positions have preset operating modes such that the unit waits for an acknowledgment prior to executing a move or moves immediately after sending a notification, without waiting for an acknowledgment. If an extended wait period is required for an acknowledgment, the user may be provided with an optional talk permit indication once the acknowledgment has been received. If an acknowledgment is required at step 211, then the process continues with step 213, where a timer is started and the communication unit waits for an acknowledgment. If at step 215 an acknowledgment is not yet received, the process continues with step 217, where the communication unit determines if the timer, started in step 213, has expired. If the timer has not expired, the process continues with step 215. If the timer has expired, the process continues with step 219, the communication unit 109 or 117 determines if a no-acknowledgment change is okay for this particular communication unit. In other words, the communication unit 109 or 117 determines if the communication unit 109 or 117 is allowed to change if an acknowledgment is not received within a certain period of time. In the preferred embodiment, a slot in memory is set aside for this information, which may be preprogrammed into the communication unit 109 or 117, on a unit wide or per channel basis, and may be reprogrammed later. If such a change of communication resource is not okay, for example, as preprogrammed in the communication unit, then the process continues with step 223.

If no notification is required at step 203, or an acknowledgment is not required at step 211, or an acknowledgment is received at step 215, or it is okay to make a change without an acknowledgment at step 219, then the process continues with step 221. At step 221, the communication unit 109 or 117 changes the communication resource to the communication resource affiliated with the communication mode selected by the user at step 201. At step 203, the communication unit may optionally notify the user of the change of communication mode made at step 221. If step 223 was reached through step 219, and a no-acknowledgment change was not allowed, then the user will be notified that the mode change will not take place, and the process ends.

The present invention eliminates the need for manual notification of a communication mode change. The time needed to notify the dispatcher of a change is substantially reduced, and the reliability of the information is increased, because the information is now provided automatically. Because this method increases the information accuracy, as human verbal interpretation is not involved, greater efficiency is provided. This method also provides a dispatcher with means to determine when the user of a communication unit moves out of his home system. In addition, the communication system can point the dispatcher to a communication mode outside the system or within the system in order to locate a communication unit that does not answer a call.

For example, when a trunked police communication unit's users wishes to move to a conventional tactical channel in order to communicate directly with other communication units on a stakeout, the user would have previously had to verbally call a dispatcher, announce the intended move, and wait for a response before changing channels. Such an operation could take six or more seconds. With the present invention, the user would select a desired path on his channel selector, a communication unit would automatically notify the system of the new path and then the communication unit will make the desired change in frequency. The method provided by the present invention would take less than half a second, and require no involvement on the part of the dispatcher or the user.

What is claimed is:

1. A method comprising the steps of:

detecting, by a communication unit having an identification (ID) within a communications system having an infrastructure, that the communication unit's user initiated a communications mode change from a first communication path having a home system to a second communication path having an identity, wherein the infrastructure is affiliated with the home system of the first communication path;

transmitting, by the communication unit to the infrastructure, a communications mode change message including the ID and the identity of the second communication path.

2. The method of claim 1, wherein the second communication path is part of the communications system.

3. The method of claim 1, wherein the second communication path is part of another communications system.

4. The method of claim 1, further comprising the steps of:

determining whether an acknowledgment of receipt of the message by the infrastructure is required;

if an acknowledgment is required, receiving the acknowledgment before changing the communication unit to the second communication path; and if an acknowledgment is not required, changing the communication unit to the second communication path.

5. The method of claim 4, further comprising the steps of:
if an acknowledgment is required, starting a timer when the message is transmitted;
when the timer expires, if the acknowledgment is not yet received, changing the communication unit to the second communication path if the communication unit is programmed to permit an unacknowledged change after timer expiration.

6. The method of claim 4, further comprising the steps of:
if an acknowledgment is required, starting a timer when the message is transmitted;
when the timer expires, if the acknowledgment is not yet received, prohibiting changing of the communication unit to the second communication path if the communication unit is programmed to prevent an unacknowledged change after timer expiration.

7. The method of claim 1, further comprising the steps of:
before transmitting the message, determining whether to transmit the message on the first communication path or on a third communication path; and
transmitting the message accordingly.

8. The method of claim 1, wherein the communications mode change comprises changing from a first mode comprising one of trunked, conventional, talk-around, cellular, and roaming to a second mode comprising a different one of trunked, conventional, talk-around, cellular, and roaming.

9. The method of claim 1, wherein the communications mode change comprises changing from a first mode comprising one of trunked, conventional, talk-around, cellular, and roaming to a second mode comprising a different one of conventional and talk-around.

10. A method comprising the steps of:
detecting, by a communication unit having an identification (ID) within a communications system having an infrastructure, that the communication unit's user initiated a communications mode change from a first communication path having a home system to a second communication path having an identity, wherein the infrastructure is affiliated with the home system of the first communication path;
determining, based on the identity of the first communication path, whether the infrastructure needs to be informed of the communications mode change;
if the infrastructure needs to be informed of the communications mode change, transmitting, by the communication unit to the infrastructure, a communications mode change message including the ID and the identity of the second communication path.

11. The method of claim 10, further comprising the steps of:
before transmitting the message, determining whether to transmit the message on the first communication path or on a third communication path; and
transmitting the message accordingly.

12. The method of claim 10, wherein the second communication path is part of the communications system.

13. The method of claim 10, wherein the second communication path is part of another communications system.

14. The method of claim 10, further comprising the steps of:
determining whether an acknowledgment of receipt of the message by the infrastructure is required;
if an acknowledgment is required, receiving the acknowledgment before changing the communication unit to the second communication path; and
if an acknowledgment is not required, changing the communication unit to the second communication path.

15. The method of claim 14, further comprising the steps of:
if an acknowledgment is required, starting a timer when the message is transmitted;
when the timer expires, if the acknowledgment is not yet received, changing the communication unit to the second communication path if the communication unit is programmed to permit an unacknowledged change after timer expiration.

16. The method of claim 14, further comprising the steps of:
if an acknowledgment is required, starting a timer when the message is transmitted;
when the timer expires, if the acknowledgment is not yet received, prohibiting changing of the communication unit to the second communication path if the communication unit is programmed to prevent an unacknowledged change after timer expiration.

17. The method of claim 10, wherein the communications mode change comprises changing from a first mode comprising one of trunked, conventional, talk-around, cellular, and roaming to a second mode comprising a different one of trunked, conventional, talk-around, cellular, and roaming.

18. The method of claim 10, wherein the communications mode change comprises changing from a first mode comprising one of trunked, conventional, talk-around, cellular, and roaming to a second mode comprising a different one of conventional and talk-around.

* * * * *